United States Patent [19]

Inggs

[11] Patent Number: 4,734,314
[45] Date of Patent: Mar. 29, 1988

[54] RUBBER LININGS

[75] Inventor: Cyril H. Inggs, Sandton, South Africa

[73] Assignee: Conveyor & Transmission Supply (Proprietary) Limited, Transvaal, South Africa

[21] Appl. No.: 927,750

[22] Filed: Nov. 6, 1986

[51] Int. Cl.⁴ .............. B32B 3/00; B32B 7/02; B32B 25/00
[52] U.S. Cl. .................... 428/174; 428/213; 428/217; 428/493
[58] Field of Search ............ 428/217, 493, 31, 80, 428/81, 174, 122, 213

[56] References Cited

U.S. PATENT DOCUMENTS

| | | | |
|---|---|---|---|
| 2,167,716 | 8/1939 | Harkins | 428/493 |
| 2,744,280 | 7/1953 | O'Neil, Jr. | 428/316.6 |
| 4,215,178 | 7/1980 | Martin, Jr. | 428/493 |
| 4,366,196 | 12/1982 | Maekawa et al. | 428/217 |
| 4,446,192 | 5/1984 | Dehlén | 428/493 |
| 4,447,488 | 5/1984 | Simm et al. | 428/217 |
| 4,567,088 | 1/1986 | Skogman et al. | 428/217 |

Primary Examiner—William J. Van Balen
Attorney, Agent, or Firm—Scully, Scott, Murphy & Presser

[57] ABSTRACT

A rubber lining component is composed of an upper part which has a different degree of hardness to a lower part. The upper part may have a Shore hardness of 70 while the lower part has a Shore hardness of 35.

4 Claims, 3 Drawing Figures

FIG_1
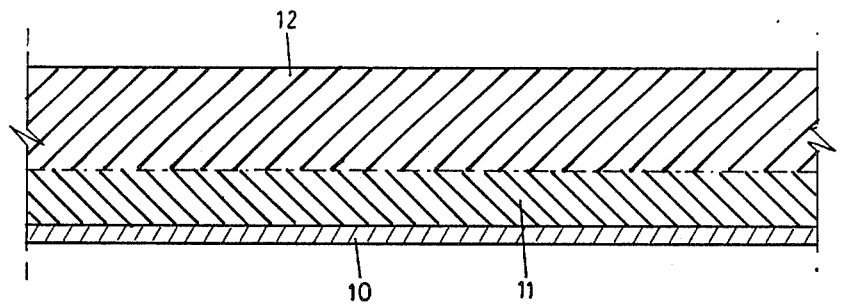
FIG_2
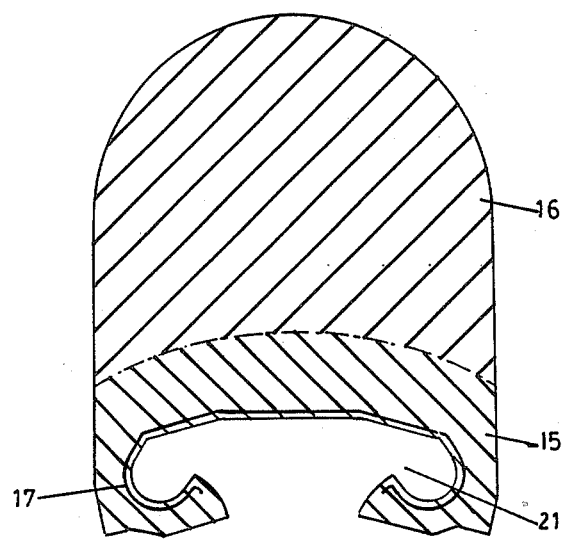

FIG_3
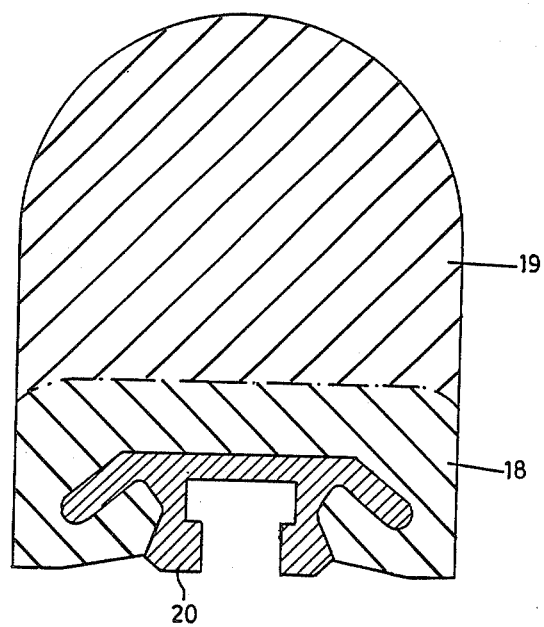

RUBBER LININGS

BACKGROUND TO THE INVENTION

This invention relates to rubber linings.

Rubber linings are today used to provide wear systems in a larger number of applications such as skip linings, truck linings, chute linings and even as lifter bars in ball mills, rod mills and pebble mills.

Although rubber lasts much longer than the materials which it has replaced, it is believed that there is room for improving the wear characteristics of the rubber linings.

SUMMARY OF THE INVENTION

According to the invention a rubber wear component is a composite of two rubbers having different degrees of hardness, the harder part being at the wear surface and the softer part underlying the harder part.

The softer part of the component would usually make up about one third by volume of the component.

DESCRIPTION OF THE DRAWINGS

FIG. 1 is a section through a wear plate according to the invention,

FIG. 2 is a section through a rubber lifter bar, and

FIG. 3 is a section through a rubber lifter bar with an integral metal insert vulcanised at the base.

DESCRIPTION OF EMBODIMENTS

In FIG. 1 there is a wear plate of rubber moulded on to a metal plate 10. The rubber part is composed of two integrally moulded parts 11 and 12 with the part 11 having Shore hardness of 35 and the part 12 a Shore hardness of 70.

FIG. 2 shows a lifter bar which has a lower section 15 integrally moulded with an upper section 16. In this case also the lower section 15 has a Shore hardness of 35 while the top section has a Shore hardness of 70, being the conventional hardness throughout for lifter bars. Imbedded into the lower section 15, in the manufacturing process, is a fabric reinforcement 17 around a T-shaped cavity 21.

The extra resilience or yield provided by the lower part of lesser hardness seems to improve the wear characteristics of the upper part in each case.

FIG. 3 illustrates a lifter bar having a lower section 18 integrally moulded with an upper section 19. Again, the lower section 18 has a Shore hardness of 35 where the top section has a Shore hardness of 70. A metal insert 20 is located in the lower section 18.

I claim:

1. A lifter bar comprising two integrally molded rubber parts forming an upper part and a lower part, said upper part having a high degree of hardness and said lower part having a degree of hardness lower than said upper part, said lower part being not more than one third of the thickness of said upper part.

2. The lifter bar claimed in claim 1 in which the lower part has a T-shaped cavity which can fit over a metal bar.

3. The lifter bar claimed in claim 2 in which a fabric reinforcement is embedded in the lower part around said cavity.

4. The lifter bar claimed in claim 1 in which a metal insert is integrally vulcanized in the lower part.

* * * * *